(12) United States Patent
Sato et al.

(10) Patent No.: US 6,414,068 B1
(45) Date of Patent: Jul. 2, 2002

(54) OLEFIN-BASED RESIN COMPOSITION

(75) Inventors: Masashi Sato; Tatsuya Hase; Hiroshi Fujimoto, all of Yokkaichi (JP)

(73) Assignees: Sumitomo Wiring Systems, Ltd., Yokkaichi; Sumitomo Electric Industries, Ltd., Osaka, both of (JP)

( * ) Notice: Subject to any disclaimer, the term of this patent is extended or adjusted under 35 U.S.C. 154(b) by 0 days.

(21) Appl. No.: 09/759,214

(22) Filed: Jan. 16, 2001

(51) Int. Cl.$^7$ .............................. C08K 3/10; C08L 51/06
(52) U.S. Cl. ...................... 524/436; 524/437; 524/504; 524/515; 523/173
(58) Field of Search ................................ 524/436, 437, 524/504, 515; 523/173

(56) References Cited

U.S. PATENT DOCUMENTS

| | | |
|---|---|---|
| 4,622,350 A | 11/1986 | Icenogle et al. |
| 4,722,959 A | 2/1988 | Inoue et al. |
| 4,794,132 A | 12/1988 | Djiauw et al. |
| 4,826,899 A | 5/1989 | Rees |
| 4,853,154 A | 8/1989 | Icenogle et al. |
| 4,863,995 A | 9/1989 | Murakami et al. |
| 4,942,069 A | 7/1990 | Keogh |
| 4,952,428 A | 8/1990 | Keogh |
| 4,983,742 A | 1/1991 | Yusawa et al. |
| 5,025,042 A | 6/1991 | Yoshida et al. |
| 5,057,367 A | 10/1991 | Morii et al. |
| 5,104,920 A | 4/1992 | Keogh |
| 5,211,746 A | 5/1993 | Keogh et al. |
| 5,262,467 A | 11/1993 | Keogh et al. |
| 5,317,051 A | 5/1994 | Harashige et al. |
| 5,401,787 A | 3/1995 | Tonyali |
| 5,418,272 A | 5/1995 | Kawabata et al. |
| 5,444,809 A | 8/1995 | Aoki et al. |
| 5,468,807 A | 11/1995 | Tsurutani et al. |
| 5,473,016 A | 12/1995 | Fujii et al. |
| 5,476,709 A | 12/1995 | Inoue et al. |
| 5,482,990 A | 1/1996 | Jow et al. |
| 5,561,185 A | 10/1996 | Hashimoto et al. |
| 5,573,840 A | 11/1996 | Inoue et al. |
| 5,656,371 A | 8/1997 | Kawahigashi et al. |
| 5,670,748 A | 9/1997 | Gingue et al. |
| 5,698,323 A | 12/1997 | Keough et al. |
| 5,707,732 A | 1/1998 | Sonoda et al. |
| 5,747,574 A | 5/1998 | Kanamori |
| 5,889,087 A | 3/1999 | Hayashi et al. |
| 5,959,030 A | * 9/1999 | Berta |
| 5,973,070 A | 10/1999 | Baann |
| 6,025,422 A | 2/2000 | Hall |
| 6,025,423 A | 2/2000 | Breant |
| 6,034,162 A | 3/2000 | Mizutani et al. |
| 6,200,679 B1 | 3/2001 | Hase et al. |

FOREIGN PATENT DOCUMENTS

| | | |
|---|---|---|
| DE | 4230157 | 12/1993 |
| DE | 4440394 | 5/1995 |
| EP | 0508415 | 10/1992 |
| EP | 0530940 | 3/1993 |
| EP | 0871181 | 10/1998 |
| EP | 0972803 | 1/2000 |
| JP | 7-78518 | 3/1995 |
| JP | 7-176219 | 7/1995 |
| JP | 7-182930 | 7/1995 |
| WO | 96/22328 | 7/1996 |

OTHER PUBLICATIONS

English Language Abstract of JP 7–176219. Jul. 1995.
English Language Abstract of JP 7–78518. Mar. 1995.
JP 6283030, Oct. 1994.
JP 3031076, Apr. 2000.

\* cited by examiner

*Primary Examiner*—Tae H. Yoon
(74) *Attorney, Agent, or Firm*—Greenblum & Bernstein, P.L.C.

(57) ABSTRACT

There is provided an olefin-based resin composition which may be applied to the coatings of electrical cables used in automobiles. The coatings have neatly balanced properties to satisfy product requirements, such as wear and flame resistance, tensile strength, flexibility, and heat and freeze resistance. The olefin-based resin composition includes: (i) polymeric material in an amount of 100 parts by weight which includes: (a) about 30 to 94 parts by weight of propylene polymer portion including at least one propylene polymer having a melt flow rate of up to about 5 g/10 min; (b) about 1 to 20 parts by weight of at least one polyolefin, a proportion of about 0.1 to 10% by weight of which is structurally modified through maleic acid anhydride treatment, so that the at least one polyolefin has a Shore D hardness of at least about 50; and (c) about 5 to 50 parts by weight of at least one olefin-based polymer, a proportion of about 0.1 to 10% by weight of which is structurally modified through maleic acid anhydride treatment, so that the at least one olefin-based polymer has a Shore A hardness of up to about 95; and (ii) about 30 to 200 parts by weight of at least one metal hydroxide.

38 Claims, No Drawings

OLEFIN-BASED RESIN COMPOSITION

BACKGROUND OF THE INVENTION

1. Field of the Invention

The present invention relates to olefin-based resin compositions, and more preferably halogen-free olefin-based resin compositions. These compositions are applied to coatings of electrical cables used in automobiles. The compositions preferably satisfy the requirements of automobile applications, such as wear resistance, flame resistance, tensile strength and flexibility. The invention also concerns electrical cables coated with such compositions.

2. Description of Background Information

Poly(vinylchloride) has been the coating material for automobile electrical cables. The reason is that this polymer has good mechanical strength, formability at extrusion with electrical cables, flexibility and paintability. The polymer also provides an inexpensive base material.

Recently, however, global environmental concerns have compelled the car industry to reconsider the choice of product types used for automobile parts, including the coatings of electrical cables. As a result, halogen-free resin materials are currently replacing poly(vinylchloride).

There have been investigations into wear-resistant resin compositions that do not generate toxic gases, such as halogen gases, when they are burned. Such compositions include halogen-free compositions containing a polyolefin-based polymer and a metal hydroxide as a flame retardant, as disclosed in Japanese patent applications published under Nos. HEI 7-176219 and HEI 7-78518, the disclosures of which are herein incorporated by reference in their entireties. Further, Japanese patent application published under No. HEI 7-182930, the disclosure of which is herein incorporated by reference in its entirety, describes a composition containing a polymeric material consisting of a polypropylene-type resin, a polyethylene treated with an unsaturated carboxylic acid and an ethylene-type copolymer, on the one hand, and a metal hydroxide, on the other.

However, when such compositions are used in order to retard combustion or to perform auto-extinction of the flame, metal hydroxides must be added to the compositions in large amounts. The mechanical properties of the compositions, such as wear resistance and tensile strength, are then deteriorated a great deal. In order to avoid such deterioration in mechanical strength, it has been contemplated to add polypropylenes or a high-density polyethylene which are relatively hard resins. However, the coated electrical cables then become less flexible and less formable.

SUMMARY OF THE INVENTION

An aspect of the present invention is therefore to provide a preferably halogen-free olefin-based resin composition which has well-balanced properties required for the coatings of electrical cable used in automobiles, such as wear resistance, flame resistance, tensile strength, flexibility, heat resistance and low-temperature resistance.

To this end, there is provided an olefin-based resin composition comprising:

(i) polymeric material in an amount of 100 parts by weight which includes:
  (a) about 30 to 94 parts by weight of propylene polymer portion comprising at least one propylene polymer having a melt flow rate of up to about 5 g/10 min;
  (b) about 1 to 20 parts by weight of at least one polyolefin, a proportion of about 0.1 to 10% by weight of which is structurally modified through maleic acid anhydride treatment, so that the at least one polyolefin has a Shore D hardness of at least about 50; and
  (c) about 5 to 50 parts by weight of at least one olefin-based polymer, a proportion of about 0.1 to 10% by weight of which is structurally modified through maleic acid anhydride treatment, so that the at least one olefin-based polymer has a Shore A hardness of up to about 95; and (ii) about 30 to 200 parts by weight of at least one metal hydroxide.

Preferably, the polyolefin portion treated with maleic acid anhydride (b) accounts for a proportion of about 5 to 20% by weight of the polymeric material (i), the olefin-based polymer portion (c) accounts for a proportion of about 5 to 30% by weight of the polymeric material (i), and the metal hydroxide product (ii) comprises at least one metal hydroxide in an amount of about 50 to 150 parts by weight relative to said polymeric material (i).

Preferably yet, the metal hydroxide product (ii) comprises at least one metal hydroxide in an amount of about 70 to 90 parts by weight relative to the polymeric material (i).

Suitably, the propylene polymer portion (a) comprises at least one of propylene-ethylene block copolymer in which propylene constitutes at least 50% by weight of the block copolymer, propylene-ethylene random copolymer in which propylene constitutes at least 50% by weight of the random copolymer, and propylene homopolymer.

Preferably, polyolefin portion treated with maleic acid anhydride (b) comprises at least polypropylene structurally modified through maleic acid anhydride treatment.

Typically, the olefin-based polymer portion (c) comprises at least ethylene-vinyl acetate copolymer structurally modified through maleic acid anhydride treatment.

The metal hydroxide product (ii) in the above composition preferably comprises magnesium hydroxide.

In a suitable embodiment, the metal hydroxide product (ii), e.g., magnesium hydroxide, is treated with silane coupling agent.

Preferably, such magnesium hydroxide includes a surface, at least part of which is treated with silane coupling agent.

Further, the silane coupling agent preferably comprises aminosilane coupling agent.

As understood from the foregoing, the olefin-based resin composition according to the invention is substantially free of halogen compounds.

The invention further concerns an electrical cable coated with such an olefin-based resin composition as mentioned above.

DETAILED DESCRIPTION

The above and other objects, features and advantages of the present invention will be made apparent from the following illustrative description.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

The propylene polymer portion having a melt flow rate (MFR) of up to about 5 g/10 min., typically ranging between about 0.1 and 5 g/10 min., preferably includes, for example, propylene homopolymer, and propylene-ethylene block or random copolymer, in which propylene accounts for at least 50% by weight of the corresponding block or random copolymer, and mixtures thereof.

Examples of such propylene polymer portion having a MFR of up to about 5 g/10 min. include RB610A (block copolymer), RB410 (random copolymer) and RB110 (homopolymer), manufactured and commercialized by TOKUYAMA CORP.

When the proportion of such propylene polymer portion exceeds the above-mentioned upper limit of about 94% by weight of the polymeric material (i), the composition obtained is less flexible and less formable.

Conversely, when its proportion is less than the lower limit of about 30% by weight, the composition obtained is less resistant to wear.

In this application, MFR is measured according to the method based on Standard JIS K 6921-2.

Examples of the anhydride-treated polyolefin portion (b) include polyethylene, polypropylene, polybutene, ethylene-vinyl acetate copolymer (EVA), ethylene-ethyl acrylate copolymer (EEA), ethylene-methyl acrylate copolymer (EMA), ethylene-methyl methacrylate copolymer, ethylene-propylene rubber and ethylene-butene copolymer, and mixtures thereof. A preferred example is polypropylene treated with maleic acid anhydride, since it gives an inventive compound having a sufficient level of hardness and wear resistance, without performing cross-linking.

The proportion of the polyolefin portion treated with maleic acid anhydride (b) preferably ranges from about 1 to 20, more preferably from about 5 to 20% by weight of the polymeric material (i).

When its proportion exceeds the upper limit of about 20% by weight, the composition obtained is less flexible and less formable.

Conversely, when its proportion is less than the lower limit of about 1% by weight, the composition is less resistant to wear.

Examples of the olefin-based polymer portion (c) include polyolefins such as polyethylene, polypropylene, polybutene, ethylene-vinyl acetate copolymer (EVA), ethylene-ethyl acrylate copolymer (EEA), ethylene-methyl acrylate copolymer (EMA), ethylene-methyl methacrylate copolymer, ethylene-propylene rubber and ethylene-butene copolymer, and mixtures thereof. A preferred olefin-based polymer portion is EVA treated with maleic acid anhydride.

The proportion of the olefin-based polymer portion (c) treated with maleic acid anhydride preferably ranges from about 5 to 50%, more preferably from about 5 to 30% by weight of the polymeric material (i).

When its proportion exceeds the upper limit of about 50% by weight, the composition becomes less resistant to wear. Conversely, when its proportion is less than the lower limit of about 5% by weight, the composition becomes less flexible and less formable. Examples of the metal hydroxide product (ii) include magnesium hydroxide and aluminum hydroxide. Suitably, particles of the metal hydroxide product (ii) used in the invention are treated with a coupling agent, preferably a silane coupling agent or a higher fatty acid. Examples of the silane coupling agent include aminosilane coupling agent, vinylsilane coupling agent and epoxysilane coupling agent. Examples of the higher fatty acid include stearic acid and oleic acid. Among the above examples, magnesium hydroxide treated with aminosilane coupling agent is most preferably used.

The amount of metal hydroxide product (ii), added to 100 parts by weight of the polymeric material (i), ranges from preferably about 30 to 200, more preferably from about 50 to 150, even more preferably from about 70 to 90 parts by weight.

When the amount of metal hydroxide product (ii) is too high, the composition has a smaller elongation rate, and it becomes less resistant to wear, and less flexible and less formable.

On the other hand, when its amount is too low, the composition becomes less resistant to flame.

The olefin-based resin composition of the present invention may further contain an appropriate amount of additives, such as usual additives, such as anti-oxidants, copper-damage inhibitors and lubricants, insofar as they do not impair the above described product features.

The inventive olefin-based resin composition may be prepared by mixing and kneading the polymeric material (i) and the metal hydroxide product (ii) supra, in any manner such as according to known methods.

The resin compositions of the present invention may be coated around electrical cables, e.g., the electrical cables used in automobiles, in any manner such as according to known methods.

When the inventive composition is applied to coatings of electrical cables used in automobiles, these coatings satisfy requirements in respect of wear resistance, flame resistance, tensile strength, flexibility, heat resistance, freeze resistance, etc. Obviously, these coatings preferably generate substantially no halogen gas, since no halogen compound is specifically used therein.

The aminosilane coupling agents contain, in their molecule, functional groups reacting with inorganic compounds and those reacting with organic compounds. Accordingly, when a metal hydroxide product is treated with an aminosilane coupling agent, the former is bound to the latter through those functional groups reacting with inorganic compounds. When the metal hydroxide thus treated is added to the composition, it becomes firmly bound to the maleic acid anhydride combined with the polyolefin portion (b) or the olefin-based polymer portion (c), through the aminosilane's functional groups which react with organic compounds. As a result, the inventive composition has markedly improved mechanical strengths, e.g., wear resistance, without losing its flexibility.

When an amino group (as in the above case) and/or an epoxy group is (are) present at the oleophilic group side of the silane coupling agent, that or those group(s) react(s) with the maleic acid anhydride which is combined with the polyolefin portion (b) or the olefin-based polymer portion (c). The hydrophilicity of the composition is then obviated, and its waterproofing increases. As a result, the composition becomes mechanically stronger, and more resistant to water.

EXAMPLES

The invention will be described hereafter with reference to non-limiting prophetic Examples and Comparative Examples. In this regard, each of the Examples and Comparative Examples involves magnesium hydroxide treated with an aminosilane coupling agent having a certain tradename. The use of this tradename with this magnesium hydroxide which was used to generate the data in the Examples and Comparative Examples is proprietary information here. Accordingly, magnesium hydroxide treated with an aminosilane coupling agent having a different tradename, i.e., "MAGNIFIN H5IV", was substituted in the Examples and Comparative Examples for the magnesium hydroxide treated with an aminosilane coupling agent used to generate the data. Testing has been conducted to show that "MAGNIFIN H5IV" magnesium hydroxide treated with an aminosilane coupling agent, manufactured by ALUSUISSE MARTINSWERK GmbH, functions equivalent to the magnesium hydroxide treated with an aminosilane coupling agent having the proprietary tradename, i.e., the magnesium hydroxide used to generate the data.

Examples 1 to 3 and Comparative Examples 1 to 4

The component compounds for each sample indicated in the upper part of the corresponding columns in Tables I, II and III were mixed in amounts indicated therein. The resultant mixtures were kneaded in a biaxial extruder at 250° C.

The obtained compositions were extruded around a twist conductive cable defined by ISO as 0.5 sq (7/0.32 soft copper wires, indicating 7 wires with a diameter of 0.32 mm, and forming a conductor with a cross-section area of 0.5 mm$^2$), to yield a coating thickness of 0.3 mm. The extrusion was performed in dies having a diameter of 1.6 mm and 1.0 mm, respectively, and nipples; at a die temperature of 210 to 230° C. and a cylinder temperature of 200 to 240° C.; and at a line speed of 100 m/min.

The terms in the Tables are defined as follows.

"Propylene BP" indicates a propylene-ethylene block copolymer having a MFR of 0.5 g/10 min. An example of such a block copolymer is "RB610A" manufactured by TOKUYAMA CORP.

"MAH-PP" indicates a polypropylene, 1% by weight of which is treated with maleic acid anhydride, i.e., "ER320P" polypropylene having a Shore D hardness of 76, manufactured by JAPAN POLYOLEFIN KABUSHIKI KAISHA.

"MAH-EVA" indicates an ethylene-vinyl acetate copolymer, 1% by weight of which is treated with maleic acid anhydride, i.e., "HPR VR103" ethylene-vinyl acetate copolymer having a Shore A hardness of 60, manufactured by MITSUI DUPONT CHEMICAL Kabushiki Kaisha.

"EVA" indicates an ethylene-vinyl acetate copolymer, i.e., "EV360" ethylene-vinyl acetate copolymer containing 25% by weight of vinyl acetate, manufactured by MITSUI DUPONT CHEMICAL KABUSHIKI KAISHA.

"MAGNIFIN H51V" indicates magnesium hydroxide treated with an aminosilane coupling agent, manufactured by ALUSUISSE MARTINSWERK GmbH.

The anti-aging agent was a hindered phenol compound, i.e., "TOMINOX TT" hindered phenol, manufactured by YOSHITOMI FINECHEMICALS, Ltd.

The coated electrical cables of Examples 1 to 3 and Comparative Examples 1 to 4 were subjected to tests for flame resistance, tensile strength, elongation rate and wear resistance according to the method based on Standard JASO D611 (Japanese Automobile Standard Organization).

To test wear resistance, an abrasion frequency exceeding 300 times, averaged on 3 samples, was considered as good.

Flexibility was evaluated by hand feeling, when the coated electrical cable was bent.

Formability was evaluated by observing whether or not whiskers were formed, when coatings were stripped off from the end portion of the coated electrical cable.

The results of the tests are shown in the lower part of the corresponding columns in Tables I and II.

TABLE I

|  | Ex.1 | Ex.2 | Ex.3 | Ex.4 | Ex.5 | Ex.6 |
|---|---|---|---|---|---|---|
| Propylene BP | 60 | 50 | 30 | 80 | 85 | 60 |
| MAH-PP | 10 | 10 | 20 | 10 | 10 | 20 |
| MAH-EVA | 30 | 40 | 50 | 10 | 5 | 20 |
| EVA | 90 | 90 | 90 | 70 | 70 | 70 |
| MAGNIFIN H5IV |  |  |  |  |  |  |
| Anti-aging agent | 1 | 1 | 1 | 1 | 1 | 1 |
| Total | 191 | 191 | 191 | 171 | 171 | 171 |
| Flame resistance | Good | Good | Good | Good | Good | Good |
| Tensile strength (MPa) | 32.3 | 31.2 | 31.9 | 34.2 | 31.2 | 36.2 |
| Elongation rate (%) | 276 | 280 | 270 | 448 | 480 | 348 |
| Wear resistance (frequencies) | 2603 | 1290 | 511 | 660 | 1520 | 355 |
| Flexibility | Good | Good | Good | Good | Good | Good |
| Formability | Good | Good | Good | Good | Good | Good |

Abbreviations: Ex: Example

TABLE II

|  | Com. Ex.1 | Com. Ex.2 | Com. Ex.3 | Com. Ex.4 | Com. Ex.5 | Com. Ex.6 |
|---|---|---|---|---|---|---|
| Propylene BP | 90 | 40 | 40 | 30 | 100 | 90 |
| MAH-PP | 10 | 30 |  | 10 |  |  |
| MAH-EVA |  |  | 60 | 60 |  |  |
| EVA |  | 30 |  |  |  | 10 |
| MAGNIFIN H5IV | 120 | 90 | 90 | 90 | 70 | 70 |
| Anti-aging agent | 1 | 1 | 1 | 1 | 1 | 1 |
| Total | 221 | 191 | 191 | 191 | 171 | 171 |
| Flame resistance | Good | Good | Good | Good | Good | Good |
| Tensile strength (MPa) | 22.2 | 33.9 | 26.3 | 31.8 | 34.2 | 36.0 |
| Elongation rate (%) | 437 | 107 | 380 | 280 | 683 | 658 |
| Wear resistance (frequencies) | 4726 | 4341 | 112 | 268 | 2131 | 128 |
| Flexibility | Bad | Bad | Good | Good | Bad | Good |
| Formability | Bad | Good | Good | Good | Bad | Good |

Abbreviations: Com. Ex.: Comparative Example.

TABLE III

|  | Com. Ex.7 | Com. Ex.8 | Com. Ex.9 | Com. Ex.10 | Com. Ex.11 |
|---|---|---|---|---|---|
| Propylene BP | 90 | 90 | 70 | 60 | 88 |
| MAH-PP | 10 |  |  | 10 | 10 |
| MAH-EVA |  | 10 | 30 | 30 | 2 |
| EVA |  |  |  |  |  |
| MAGNIFIN H5IV | 70 | 70 | 70 | 70 | 70 |
| Anti-aging agent | 1 | 1 | 1 | 1 | 1 |
| Total | 171 | 171 | 171 | 171 | 171 |
| Flame resistance | Good | Good | Good | Good | Good |
| Tensile strength (MPa) | 39.5 | 33.2 | 31.2 | 32.5 | 36.4 |
| Elongation rate (%) | 535 | 670 | 650 | 410 | 520 |

TABLE III-continued

|  | Com. Ex.7 | Com. Ex.8 | Com. Ex.9 | Com. Ex.10 | Com. Ex.11 |
|---|---|---|---|---|---|
| Wear resistance (frequencies) | 2862 | 231 | 84 | 148 | 2220 |
| Flexibility | Bad | Good | Good | Good | Bad |
| Formability | Bad | Good | Good | Good | Bad |

Abbreviations: Com. Ex.: Comparative Example.

The results of Examples 1 to 3 are first compared with those of Comparative Examples 1 to 4. When the polyolefin portion treated with maleic acid anhydride (b) and having a shore D hardness of at least about 50 is used in combination with the olefin-based polymer portion (c) treated with maleic acid anhydride and having a Shore A hardness of up to about 95, and both are added to the composition in appropriate amounts, the composition is resistant to wear, without losing its flexibility and formability.

As is shown from the results on Comparative Example 2, when the polyolefin portion treated with maleic-acid anhydride (b) is added to the composition in a large amount, the composition loses its flexibility.

Likewise, as shown from the results on Comparative Examples 3 and 4, when EVA treated with maleic acid anhydride is used in a large amount, the composition prepared is less resistant to wear.

Examples 4 to 6 and Comparative Examples 5 to 11

The component compounds for each sample shown in the upper part of the corresponding columns in Tables I, II and III were mixed in indicated amounts, and kneaded at 250° C. The compositions obtained were respectively extruded around an electrical cable (ISO conductor, 0.5 sq, 7/compressed conductors, soft copper wire), to yield a coating having a thickness of 0.2 mm. The extrusion was performed by using dies having a diameter of 1.3 mm and 0.88 mm, respectively, and nipples; at a die and a cylinder temperature of, respectively, 210 to 230° C. and 200 to 240° C.; and at a line speed of 100 m/min.

The coated electrical cables corresponding to Examples 4 to 6 and Comparative Examples 5 to 11 were subjected to tests for flame resistance, tensile strength, tensile elongation, wear resistance, flexibility and formability, as described for Examples 1 to 3 and Comparative Examples 1 to 4.

The results of the tests are shown in the lower part of the corresponding columns in Tables I, II and III.

The results of Examples 4 to 6 are compared with those of Comparative Examples 5 to 11. When the polyolefin portion treated with maleic acid anhydride (b) and having a Shore D hardness of at least about 50 is used in combination with the olefin-based polymer portion (c) treated with maleic acid anhydride and having a Shore A hardness of up to about 95, the composition obtained becomes resistant to wear, without losing its flexibility and formability.

As is shown from the results of Example 5, when the olefin-based polymer portion (c) is added in a reduced amount, wear resistance of the composition increases correspondingly. However, as shown by the results of Comparative Example 11, when its amount is too small, the composition becomes less flexible.

As shown from the results of Example 6 and Comparative Example 10, when the amount of the olefin-based polymer portion (c) is increased, wear resistance of the composition decreases.

Conversely, when the polyolefin portion (b) is added in a suitable amount, the resulting composition has a well-balanced wear resistance and flexibility (see Example 6 and Comparative Example 10).

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-367155, filed on Dec. 1, 2000, which is herein expressly incorporated by reference in its entirety.

What is claimed:

1. An olefin-based resin composition comprising:
   (i) polymeric material in an amount of 100 parts by weight which includes:
      (a) about 30 to 94 parts by weight of propylene polymer portion comprising at least one propylene polymer having a melt flow rate of up to about 5 g/10 min;
      (b) about 1 to 20 parts by weight of at least one polyolefin, a proportion of about 0.1 to 10% by weight of which is structurally modified through maleic acid anhydride treatment, so that the at least one polyolefin has a Shore D hardness of at least about 50; and
      (c) about 5 to 50 parts by weight of at least one olefin-based polymer, a proportion of about 0.1 to 10% by weight of which is structurally modified through maleic acid anhydride treatment, so that the at least one olefin-based polymer has a Shore A hardness of up to about 95; and
   (ii) about 30 to 200 parts by weight of at least one metal hydroxide.

2. The olefin-based resin composition according to claim 1, wherein:
   said at least one polyolefin (b) accounts for about 5 to 20 parts by weight of said polymeric material (i),
   said at least one olefin-based polymer (c) accounts for a proportion of about 5 to 30 parts by weight of said polymeric material (i), and
   said at least one metal hydroxide (ii) comprises at least one metal hydroxide in an amount of about 50 to 150 parts by weight.

3. The olefin-based resin composition according to claim 1, wherein said at least one metal hydroxide (ii) comprises at least one metal hydroxide in an amount of about 70 to 90 parts by weight.

4. The olefin-based resin composition according to claim 2, wherein said at least one metal hydroxide product (ii) comprises at least one metal hydroxide in an amount of about 70 to 90 parts by weight.

5. The olefin-based resin composition according to claim 1, wherein said propylene polymer portion (a) comprises at least one of propylene-ethylene block copolymer in which propylene constitutes at least 50% by weight of said block copolymer, propylene-ethylene random copolymer in which propylene constitutes at least 50% by weight of said random copolymer, and propylene homopolymer.

6. The olefin-based resin composition according to claim 2, wherein said propylene polymer portion (a) comprises at least one of propylene-ethylene block copolymer in which propylene constitutes at least 50% by weight of said block copolymer, propylene-ethylene random copolymer in which propylene constitutes at least 50% by weight of said random copolymer, and propylene homopolymer.

7. The olefin-based resin composition according to claim 3, wherein said propylene polymer portion (a) comprises at least one of propylene-ethylene block copolymer in which propylene constitutes at least 50% by weight of said block copolymer, propylene-ethylene random copolymer in which propylene constitutes at least 50% by weight of said random copolymer, and propylene homopolymer.

8. The olefin-based resin composition according to claim 1, wherein said at least one polyolefin (b) comprises at least polypropylene structurally modified through maleic acid anhydride treatment.

9. The olefin-based resin composition according to claim 2, wherein said at least one polyolefin (b) comprises at least polypropylene structurally modified through maleic acid anhydride treatment.

10. The olefin-based resin composition according to claim 3, wherein said at least one polyolefin (b) comprises at least polypropylene structurally modified through maleic acid anhydride treatment.

11. The olefin-based resin composition according to claim 5, wherein said at least one polyolefin (b) comprises at least polypropylene structurally modified through maleic acid anhydride treatment.

12. The olefin-based resin composition according to claim 1, wherein said at least one olefin-based polymer (c) comprises at least ethylene-vinyl acetate copolymer structurally modified through maleic acid anhydride treatment.

13. The olefin-based resin composition according to claim 2, wherein said at least one olefin-based polymer (c) comprises at least ethylene-vinyl acetate copolymer structurally modified through maleic acid anhydride treatment.

14. The olefin-based resin composition according to claim 3, wherein said at least one olefin-based polymer (c) comprises at least ethylene-vinyl acetate copolymer structurally modified through maleic acid anhydride treatment.

15. The olefin-based resin composition according to claim 5, wherein said at least one olefin-based polymer (c) comprises at least ethylene-vinyl acetate copolymer structurally modified through maleic acid anhydride treatment.

16. The olefin-based resin composition according to claim 8, wherein said at least one olefin-based polymer portion (c) comprises at least ethylene-vinyl acetate copolymer structurally modified through maleic acid anhydride treatment.

17. The olefin-based resin composition according to claim 1, wherein said at least one metal hydroxide (ii) comprises magnesium hydroxide.

18. The olefin-based resin composition according to claim 2, wherein said at least one metal hydroxide (ii) comprises magnesium hydroxide.

19. The olefin-based resin composition according to claim 3, wherein said at least one metal hydroxide (ii) comprises magnesium hydroxide.

20. The olefin-based resin composition according to claim 5, wherein said at least one metal hydroxide (ii) comprises magnesium hydroxide.

21. The olefin-based resin composition according to claim 8, wherein said at least one metal hydroxide (ii) comprises magnesium hydroxide.

22. The olefin-based resin composition according to claim 1, wherein said at least one metal hydroxide (ii) is treated with silane coupling agent.

23. The olefin-based resin composition according to claim 2, wherein said at least one metal hydroxide (ii) is treated with silane coupling agent.

24. The olefin-based resin composition according to claim 3, wherein said at least one metal hydroxide (ii) is treated with silane coupling agent.

25. The olefin-based resin composition according to claim 5, wherein said at least one metal hydroxide (ii) is treated with silane coupling agent.

26. The olefin-based resin composition according to claim 8, wherein said at least one metal hydroxide (ii) is treated with silane coupling agent.

27. The olefin-based resin composition according to claim 22, wherein said silane coupling agent comprises aminosilane coupling agent.

28. The olefin-based resin composition according to claim 23, wherein said silane coupling agent comprises aminosilane coupling agent.

29. The olefin-based resin composition according to claim 24, wherein said silane coupling agent comprises aminosilane coupling agent.

30. The olefin-based resin composition according to claim 25, wherein said silane coupling agent comprises aminosilane coupling agent.

31. The olefin-based resin composition according to claim 26, wherein said silane coupling agent comprises aminosilane coupling agent.

32. The olefin-based composition according to claim 1, wherein the olefin-based composition is halogen-free.

33. The olefin-based composition according to claim 2, wherein the olefin-based composition is halogen-free.

34. The olefin-based composition according to claim 3, wherein the olefin-based composition is halogen-free.

35. The olefin-based composition according to claim 5, wherein the olefin-based composition is halogen-free.

36. The olefin-based composition according to claim 8, wherein the olefin-based composition is halogen-free.

37. An olefin-based resin composition which is substantially free of halogen, said olefin-based resin composition comprising:
(i) polymeric material in an amount of 100 parts by weight which includes:
  (a) about 30 to 94 parts by weight of propylene polymer portion comprising at least one propylene polymer having a melt flow rate of up to about 5 g/10 min;
  (b) about 1 to 20 parts by weight of at least one polyolefin, a proportion of about 0.1 to 10% by weight of which is structurally modified through maleic acid anhydride treatment, so that the at least one polyolefin has a Shore D hardness of at least about 50; and
  (c) about 5 to 50 parts by weight of at least one olefin-based polymer, a proportion of about 0.1 to 10% by weight of which is structurally modified through maleic acid anhydride treatment, so that the at least one olefin-based polymer has a Shore A hardness of up to about 95; and
(ii) about 30 to 200 parts by weight of at least one metal hydroxide.

38. An electrical cable coated with an olefin-based resin composition, said olefin-based resin composition comprising:
(i) polymeric material in an amount of 100 parts by weight which includes:
  (a) about 30 to 94 parts by weight of propylene polymer portion comprising at least one propylene polymer having a melt flow rate of up to about 5 g/10 min;
  (b) about 1 to 20 parts by weight of at least one polyolefin, a proportion of about 0.1 to 10% by weight of which is structurally modified through maleic acid anhydride treatment, so that the at least one polyolefin has a Shore D hardness of at least about 50; and (c) about 5 to 50 parts by weight of at least one olefin-based polymer, a proportion of about 0.1 to 10% by weight of which is structurally modified through maleic acid anhydride treatment, so that the at least one olefin-based polymer has a Shore A hardness of up to about 95; and (ii) about 30 to 200 parts by weight of at least one metal hydroxide.

* * * * *